(12) United States Patent
Lecaillon et al.

(10) Patent No.: US 11,816,077 B2
(45) Date of Patent: *Nov. 14, 2023

(54) MEASURING DATA QUALITY IN A STRUCTURED DATABASE THROUGH SQL

(71) Applicant: Saudi Arabian Oil Company, Dhahran (SA)

(72) Inventors: Paul Lecaillon, Dhahran (SA); Rami Majed Aljawad, Al Qatif (SA); Ning Li, Dhahran (SA); Mohammed Jebreel Hakami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 128 days.

This patent is subject to a terminal disclaimer.

(21) Appl. No.: 17/189,946

(22) Filed: Mar. 2, 2021

(65) Prior Publication Data

US 2022/0283996 A1 Sep. 8, 2022

(51) Int. Cl.
*G06F 16/20* (2019.01)
*G06F 16/215* (2019.01)
(Continued)

(52) U.S. Cl.
CPC ........ *G06F 16/215* (2019.01); *G06F 11/3072* (2013.01); *G06F 11/3428* (2013.01); *G06F 16/24564* (2019.01); *G06F 16/287* (2019.01)

(58) Field of Classification Search
CPC .............. G06F 16/215; G06F 16/287; G06F 16/24564; G06F 11/3072; G06F 11/3428
See application file for complete search history.

(56) References Cited

U.S. PATENT DOCUMENTS

| 6,016,486 A * | 1/2000 | Nichols ................ G06Q 20/102 |
| | | 705/40 |
| 6,339,832 B1 * | 1/2002 | Bowman-Amuah ... G06F 9/542 |
| | | 710/48 |

(Continued)

FOREIGN PATENT DOCUMENTS

| CA | 2788356 | | 5/2016 |
| EP | 1921527 | * | 5/2008 |
| EP | 1921527 A2 | * | 5/2008 |

OTHER PUBLICATIONS

U.S. Appl. No. 17/189,944, Hakami et al., filed Mar. 2, 2021.
(Continued)

*Primary Examiner* — Daniel A Kuddus
(74) *Attorney, Agent, or Firm* — Fish & Richardson P.C.

(57) ABSTRACT

Some implementations of the present disclosure provide a method that include: accessing a plurality of tables that store (i) metadata that characterize a hierarch of exploration data assets, (ii) metadata that characterize a set of data quality rules, (iii) metadata that characterize defects identifiable as data records in the hierarchy of exploration data assets that fail to comply with the set of data quality rules; querying the hierarch of exploration data assets according to one or more data quality rules from the set of data quality rules; identifying instances of data records that fail to meet the one or more data quality rules; based on analyzing the instances of data records, calculating one or more data quality metrics for the hierarchy of exploration data assets; and monitoring the hierarchy of exploration data assets based on the calculated one or more data quality metrics.

20 Claims, 14 Drawing Sheets

(51) Int. Cl.
    *G06F 16/2455*     (2019.01)
    *G06F 16/28*     (2019.01)
    *G06F 11/34*     (2006.01)
    *G06F 11/30*     (2006.01)

(56) References Cited

U.S. PATENT DOCUMENTS

| | | | | |
|---|---|---|---|---|
| 6,502,213 | B1 * | 12/2002 | Bowman-Amuah | G06F 9/4812 710/266 |
| 6,529,909 | B1 * | 3/2003 | Bowman-Amuah | G06F 16/258 |
| 7,933,666 | B2 | 4/2011 | Campbell | |
| 8,984,360 | B2 | 3/2015 | Al Za'noun | |
| 10,621,203 | B2 * | 4/2020 | Hunt | G06F 16/283 |
| 2008/0270363 | A1 * | 10/2008 | Hunt | G06F 16/2462 |
| 2009/0006156 | A1 * | 1/2009 | Hunt | G06Q 10/063 705/7.11 |
| 2009/0018996 | A1 * | 1/2009 | Hunt | G06Q 30/02 |
| 2013/0055042 | A1 * | 2/2013 | Al Za'noun | G06Q 10/06395 714/E11.023 |
| 2017/0006135 | A1 * | 1/2017 | Siebel | G06Q 10/06 |
| 2017/0017913 | A1 | 1/2017 | Bharti et al. | |
| 2018/0373570 | A1 * | 12/2018 | Xu | G06T 1/20 |
| 2018/0373579 | A1 | 12/2018 | Rathore et al. | |
| 2019/0318021 | A1 * | 10/2019 | Hiu | G06F 16/215 |
| 2022/0283995 | A1 | 9/2022 | Hakami et al. | |

OTHER PUBLICATIONS

Zhang et al., "An automatic method for Core Orientation Based on Planar Geologic Features in Drill-Core Scans and Microresistivity Images," IEEE, Sep. 2022, 10 pages.

\* cited by examiner

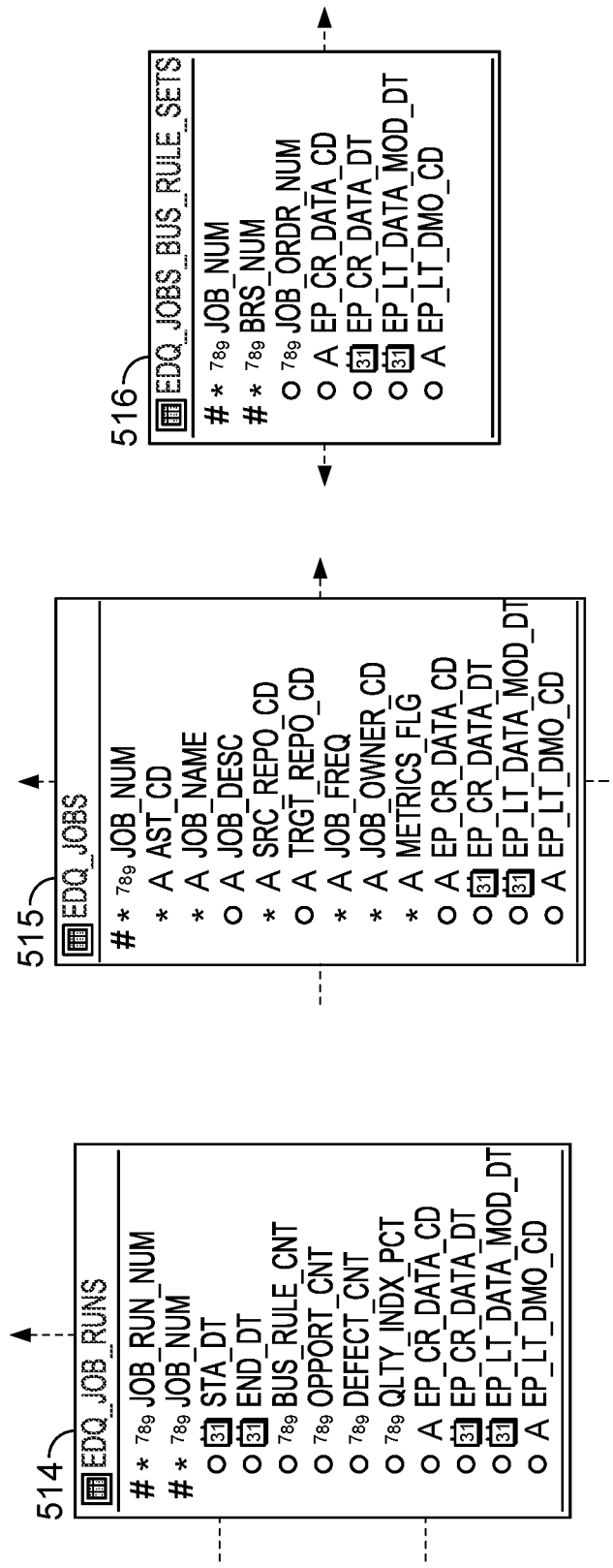

MEASURING DATA QUALITY IN A STRUCTURED DATABASE THROUGH SQL

TECHNICAL FIELD

This disclosure generally relates to managing data repositories for geophysical explorations.

BACKGROUND

Geophysical explorations can span a vast geographic area where drilling operations take place. Vast and expanding quantities of borehole data may be acquired over time from these drilling operations. The borehole data may come in disparate formats, distributed, loaded and duplicated repeatedly at multiple databases.

SUMMARY

In one aspect, some implementations provide a computer-implemented method, comprising: accessing a plurality of tables that store (i) metadata that characterize a hierarch of exploration data assets, (ii) metadata that characterize a set of data quality rules, (iii) metadata that characterize defects identifiable as data records in the hierarchy of exploration data assets that fail to comply with the set of data quality rules; querying the hierarch of exploration data assets according to one or more data quality rules from the set of data quality rules; identifying instances of data records that fail to meet the one or more data quality rules; based on analyzing the instances of data records, calculating one or more data quality metrics for the hierarchy of exploration data assets; and monitoring the hierarchy of exploration data assets based on the calculated one or more data quality metrics.

Implementations may provide one or more of the following features.

Querying the hierarch of exploration data assets may include: running one or more structured query language (SQL) statements to enforce the one or more data quality rule based on the metadata of the set of data quality rules and the metadata of the hierarch of exploration data assets. The method may further include: storing, according to the metadata that characterizes the defects, information capable of identifying the instances of the data records that fail to meet the one or more data quality rules. The method may further include: based on the stored information, calculating one or more data quality metrics for the hierarchy of exploration data assets; and monitoring the hierarchy of exploration data assets based on the calculated one or more data quality metrics.

The method may further include: launching a batch job that includes the one or more structured query language (SQL) statements such that monitor the hierarchy of exploration data assets can be monitored. The plurality of tables may further store metadata of the batch job that characterizes the batch job. The method may further include: logging information about the batch job each time the batch job runs such that a progress of the data quality metrics over time can be monitored.

In another aspect, implementations may provide a computer system comprising one or more processors configured to perform operations of: accessing a plurality of tables that store (i) metadata that characterize a hierarch of exploration data assets, (ii) metadata that characterize a set of data quality rules, (iii) metadata that characterize defects identifiable as data records in the hierarchy of exploration data assets that fail to comply with the set of data quality rules; querying the hierarch of exploration data assets according to one or more data quality rules from the set of data quality rules; identifying instances of data records that fail to meet the one or more data quality rules; based on analyzing the instances of data records, calculating one or more data quality metrics for the hierarchy of exploration data assets; and monitoring the hierarchy of exploration data assets based on the calculated one or more data quality metrics.

The implementations may include one or more of the following features.

Querying the hierarch of exploration data assets may include: running one or more structured query language (SQL) statements to enforce the one or more data quality rule based on the metadata of the set of data quality rules and the metadata of the hierarch of exploration data assets. The operations may further include: storing, according to the metadata that characterizes the defects, information capable of identifying the instances of the data records that fail to meet the one or more data quality rules. The operations may further include: based on the stored information, calculating one or more data quality metrics for the hierarchy of exploration data assets; and monitoring the hierarchy of exploration data assets based on the calculated one or more data quality metrics.

The operations may further include: launching a batch job that includes the one or more structured query language (SQL) statements such that monitor the hierarchy of exploration data assets can be monitored. The plurality of tables may further store metadata of the batch job that characterizes the batch job. The operations may further include: logging information about the batch job each time the batch job runs such that a progress of the data quality metrics over time can be monitored.

Some implementations may provide a non-transitory computer-readable medium comprising software instructions that, when executed by a computer processor, cause the computer processor to perform operations of: accessing a plurality of tables that store (i) metadata that characterize a hierarch of exploration data assets, (ii) metadata that characterize a set of data quality rules, (iii) metadata that characterize defects identifiable as data records in the hierarchy of exploration data assets that fail to comply with the set of data quality rules; querying the hierarch of exploration data assets according to one or more data quality rules from the set of data quality rules; identifying instances of data records that fail to meet the one or more data quality rules; based on analyzing the instances of data records, calculating one or more data quality metrics for the hierarchy of exploration data assets; and monitoring the hierarchy of exploration data assets based on the calculated one or more data quality metrics.

Implementations may include one or more of the following features.

Querying the hierarch of exploration data assets may include: running one or more structured query language (SQL) statements to enforce the one or more data quality rule based on the metadata of the set of data quality rules and the metadata of the hierarch of exploration data assets. The operations may further include: storing, according to the metadata that characterizes the defects, information capable of identifying the instances of the data records that fail to meet the one or more data quality rules; based on the stored information, calculating one or more data quality metrics for the hierarchy of exploration data assets; and monitoring the hierarchy of exploration data assets based on the calculated one or more data quality metrics.

The operations may further include: launching a batch job that includes the one or more structured query language (SQL) statements such that monitor the hierarchy of exploration data assets can be monitored. The plurality of tables may further store metadata of the batch job that characterizes the batch job. The operations may further include: logging information about the batch job each time the batch job runs such that a progress of the data quality metrics over time can be monitored.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Vast and expanding quantities of borehole data are acquired over time from drilling operations during geophysical explorations. The data can be in disparate formats, distributed, loaded and duplicated repeatedly among various databases. Information may be incomplete, inaccurate or uncertain. Implementations described in the present disclosure can leverage a dynamic model for measuring the quality of data in a structured database. The dynamic data model can support identification and assessment of complex quality issues such as overlapping, incorrect order, duplication, and unrealistic distance or time gaps between records. In some implementations, the dynamic model can incorporate a schema that incorporates, for example, sixteen tables storing information describing the exploration data assets. The implementations can dynamically maintain the attributes of the exploration data assets using, for example, data quality rules written in structured query language (SQL). These implementations thus provide a very well organized and scalable approach that meets changing business requirements.

The implementations allow the data quality rules to be developed in order to identify defects and measure the quality of different data types such as core description, water analysis, cuttings samples, etc. Those measurements and identified defects are shared with data proponents to either resolve the defects, or flag the defects as exception. The data quality rules can be updated in response to the identified defects. Data Managers can continue to monitor the progress of each data type and report progression of data quality. In some implementations, once the data quality rules are defined in SQL, the model is capable of capturing and aggregating the information revealing data quality issues, no matter how complex the query is. The implementations can enable the database administrator to maintain dynamic lists of attributes for each data type by running a set of data quality rules. In these implementations can capture attributes values for defect records that fail to comply with a data quality rule (or a set of data quality rules). In these implementations, data quality metrics can be generated at the level of the data quality rule and then aggregated at the job and data type levels.

Figure 1:
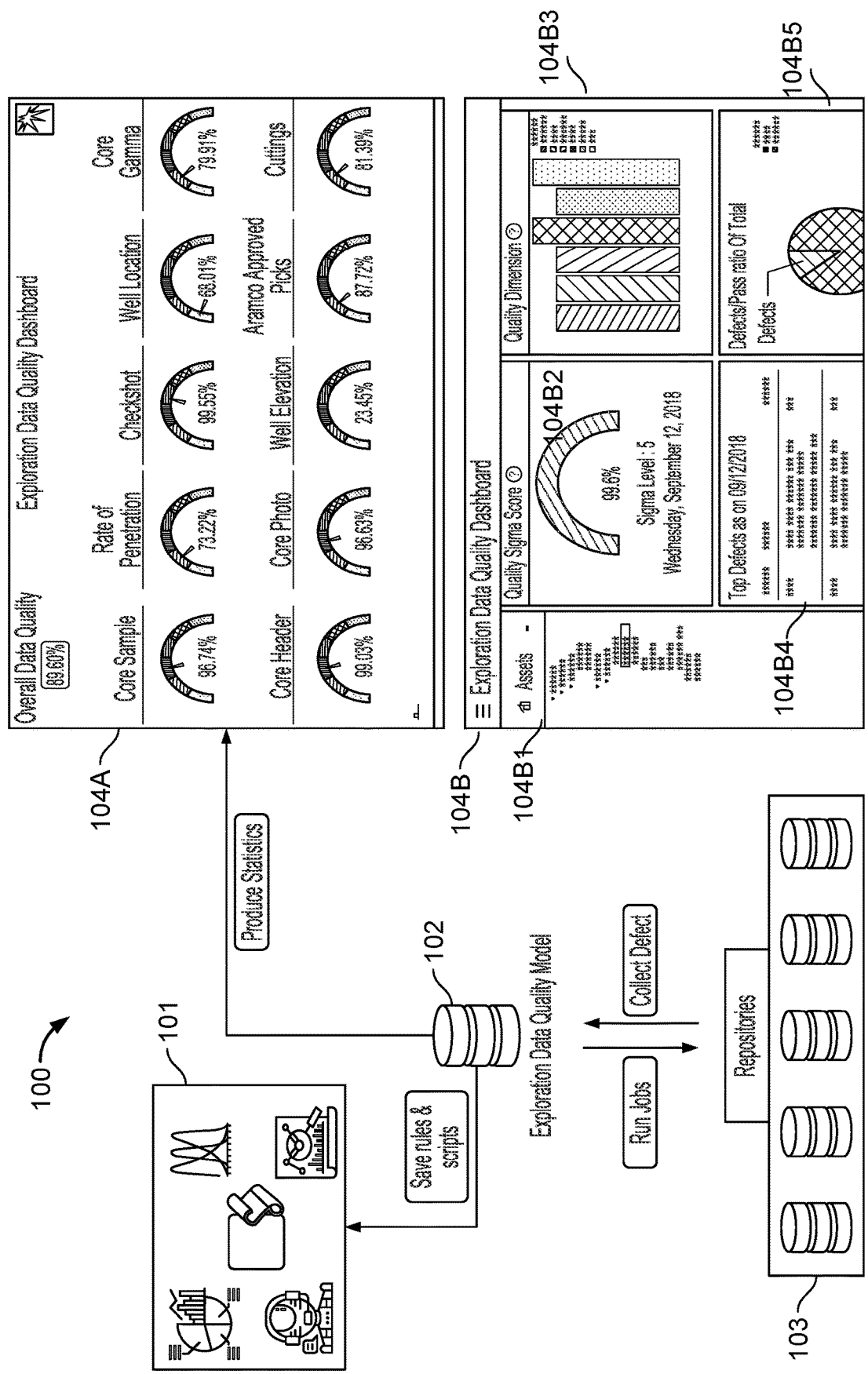
FIG. 1 illustrates an example of a framework for an exploration data quality model according to an implementation of the present disclosure.

Referring to FIG. 1, framework 100 illustrates an example for applying an exploration data quality model according to an implementation of the present disclosure. Exploration data quality model 102 may be established with respect to exploration data repositories 103. Here, exploration data repositories may include multiple databases such as Oracle databases, MySQL databases, and PostGreSQL databases. Each database may store data entries from various drilling operations, which may take place at different locales. In some implementations, the data quality model can include a database schema to capture the exploration data assets and the attributes thereof. These implementations can leverage a relational database model in which the schema can use a multitude of tables to describe the class hierarchy of data components of the model. In some cases, the data quality rules can be implemented in scripts 101 that identify records that may be defective when the records fail to comply with the data quality rules. In these cases, scripts 101 may include SQL statements and run by batch jobs. The batch jobs can be implemented in varying programming languages such as Python. The batch jobs can be executed automatically and at regular intervals to generate reports that summarize the data quality of the underlying exploratory date assets.

As illustrated, the report can include a summary dashboard 104A showing the quantitative quality metric for each data asset as well as an overall data quality metric for all data assets. The underlying data assets may include: core sample, rate of penetration, checkshot, well location, core gamma, core header, core photo, well elevation, approved cuts, and cuttings. As will be further discussed below, for example, in association with FIGS. 6A and 6B, data records in the underlying databases may present inaccurate ranges, incomplete entry, or inconsistent attributes. Various implementations can detect these defects by leveraging the data quality model as described in the present disclosure. In the illustration, the quantitative quality metric includes a percentage of detects as well as a grading of acceptance level. For example, a green acceptance level may indicate a fully acceptable level, a yellow acceptance level may indicate a marginally acceptable, and a red acceptance level may indicate an unsatisfactory level.

Dashboard 104B illustrates a different view of the report. As illustrated in area 104B1, the assets class can include the subclasses of well, document, and seismic. The subclass of well can include well header (which in turn includes well location and well classification), and wellbore (which in turn includes core, logs, well test, picks, directional, and hydrocarbon show). The subclass of core includes core header, core description, and core sample. Area 104B2 illustrates two data quality rules, namely rules 2043 and 2057, each specifying a constraint of an attribute of a data component. The constraint can be relative to another data component, for example, a parent data component. The constraint can also be absolute in that a particular record must require a primary value. As illustrated in area 104B3, for the chosen subclass of core description, the quality sigma score is 99.6% and the signal level is 5. As illustrated in area 104B4, the quality dimensions include accuracy, completeness, consistency, timeliness, uniqueness, and validity. Area 104B5 shows a pie chart of the defect/pass ratio for the chosen data asset of "core description."

Figures 2A, 2B:
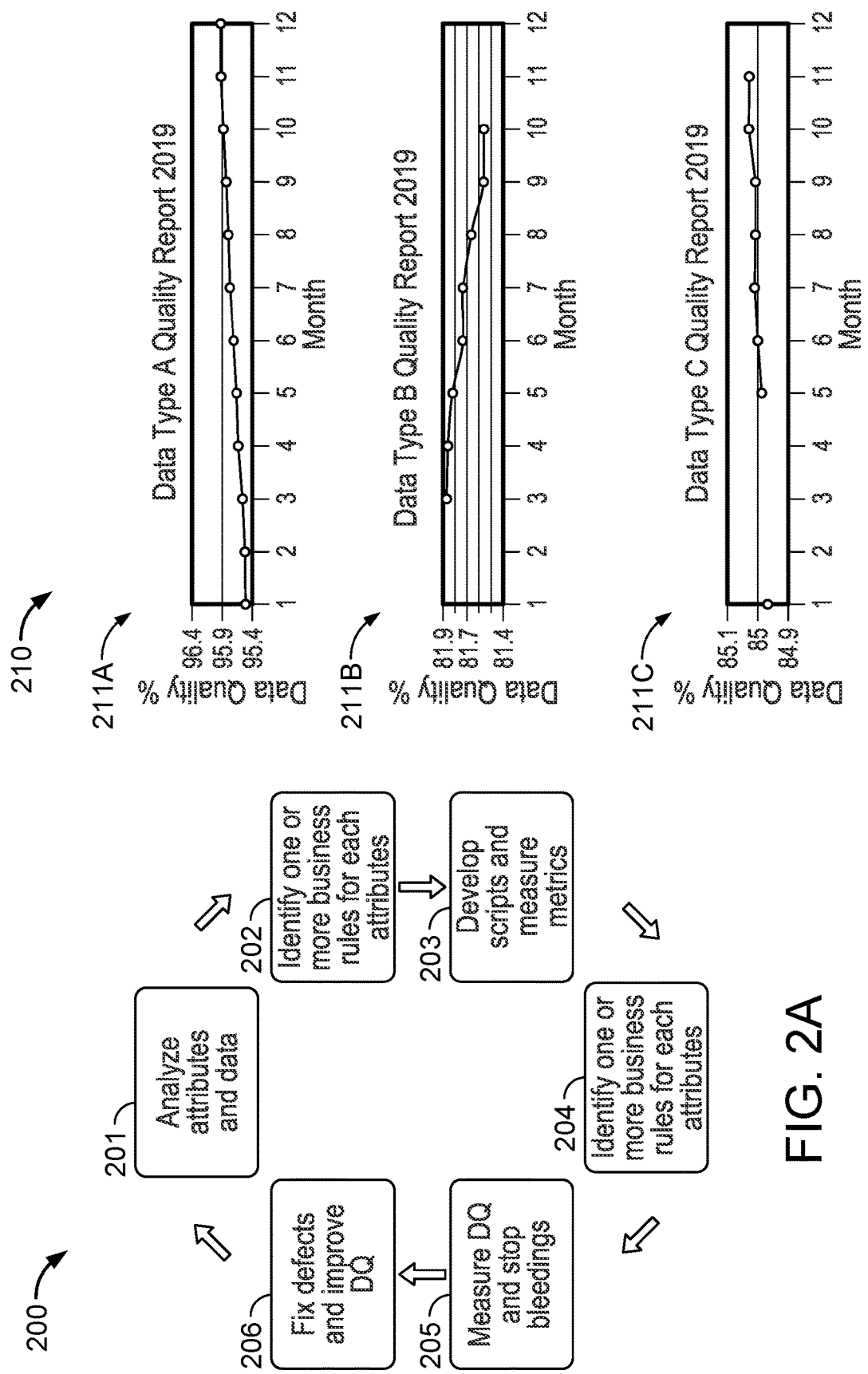
FIG. 2A shows a diagram of a process flow for the exploration data quality model according to an implementation of the present disclosure.
FIG. 2B shows examples of reports generated by the process flow of FIG. 2A.

Further referring to FIGS. 2A and 2B, cycle 200 illustrates an example of running the exploration data quality model to manage quality of the underlying data asset. In block 201, the underlying data and the attributes may be analyzed. The analysis may reveal the existence of incomplete data records, inconsistent attributes, and inaccurate/overlapping ranges. Based on the insight, one or more data quality rules can be identified for spotting these defects in the database (202). Scripts may then be developed for the entire underlying databases to identify defects and measure quality metrics (203). The scripts may be written in SQL statements to identify records that fail to comply with the data quality rules. The identified records may indicate records that have incomplete fields, fail to meet relative or absolute constraints, or have become stale. The implementations may generate reports to summary the data quality metrics. Panel 210 illustrates three examples of data quality report, namely, 211A, 211B, and 211C, showing the measured data metrics for data records of varies types from the year 2019. In some cases, the data quality model for the underlying database can be adjusted (204), for example, when the data quality model need to be expanded to account for additional inconsistencies, or retooled to give more weight to data records from certain drilling operations.

Figure 3:
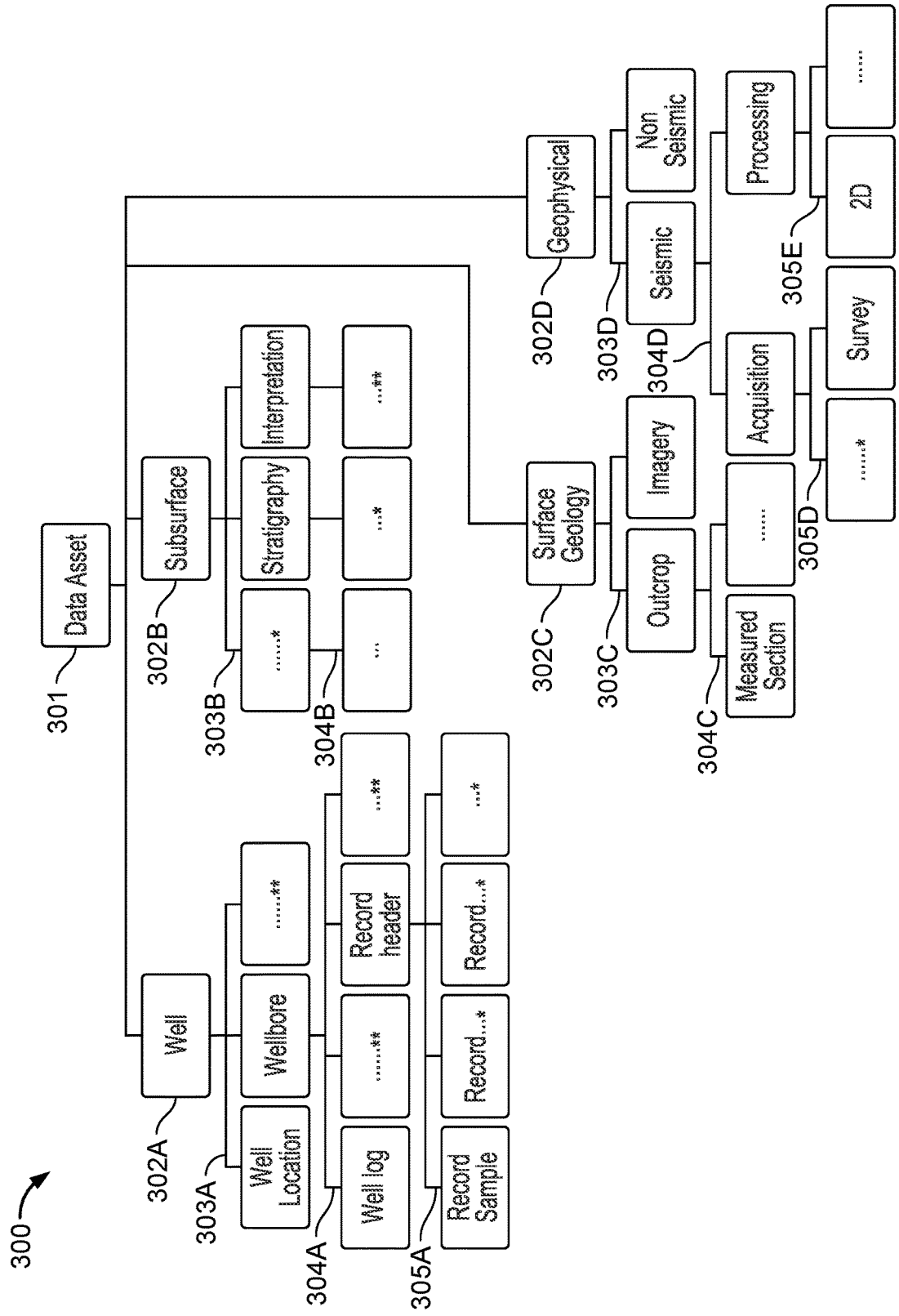
FIG. 3 shows an example of a tree-structured hierarchy of data assets as managed by some implementations of the present disclosure.

Further referring to FIG. 3, some implementations may incorporate a data quality model that describes the data hierarchy in a tree structure 300. As illustrated, data asset 301 is the root node of the tree structure 300. Each of the root node and the branch nodes corresponds to a class of database objects. Each database object may follow hierarchy of the tree structure 300. The first level branch nodes may include well 302A, subsurface 302B, surface geology 302C, and geophysical 302D. Well 302A may include second level branch nodes 303A, which can include well location and well bore. Subsurface 302B may include second level branch nodes 303B, which can include stratigraphy and interpretation. Surface geology 302C may include second level branch nodes 303C, which can include outcrop and imagery. Geophysical 302D may include second level branch nodes 303D, which can include seismic and non-seismic data. For the wellbore object, the third level nodes 304A can include well log and record header. For the outcrop object, the third level branch nodes 304C can include measured section. For the seismic object, the third level branch nodes 304D can include the objects of acquisition and processing. For the record header object, the fourth level branch nodes 305A may include the object of record sample. For the acquisition object, the fourth level branch nodes 305D may include the survey object. For the processing object, the fourth level branch nodes 305E may include the 2D object.

Figure 4:
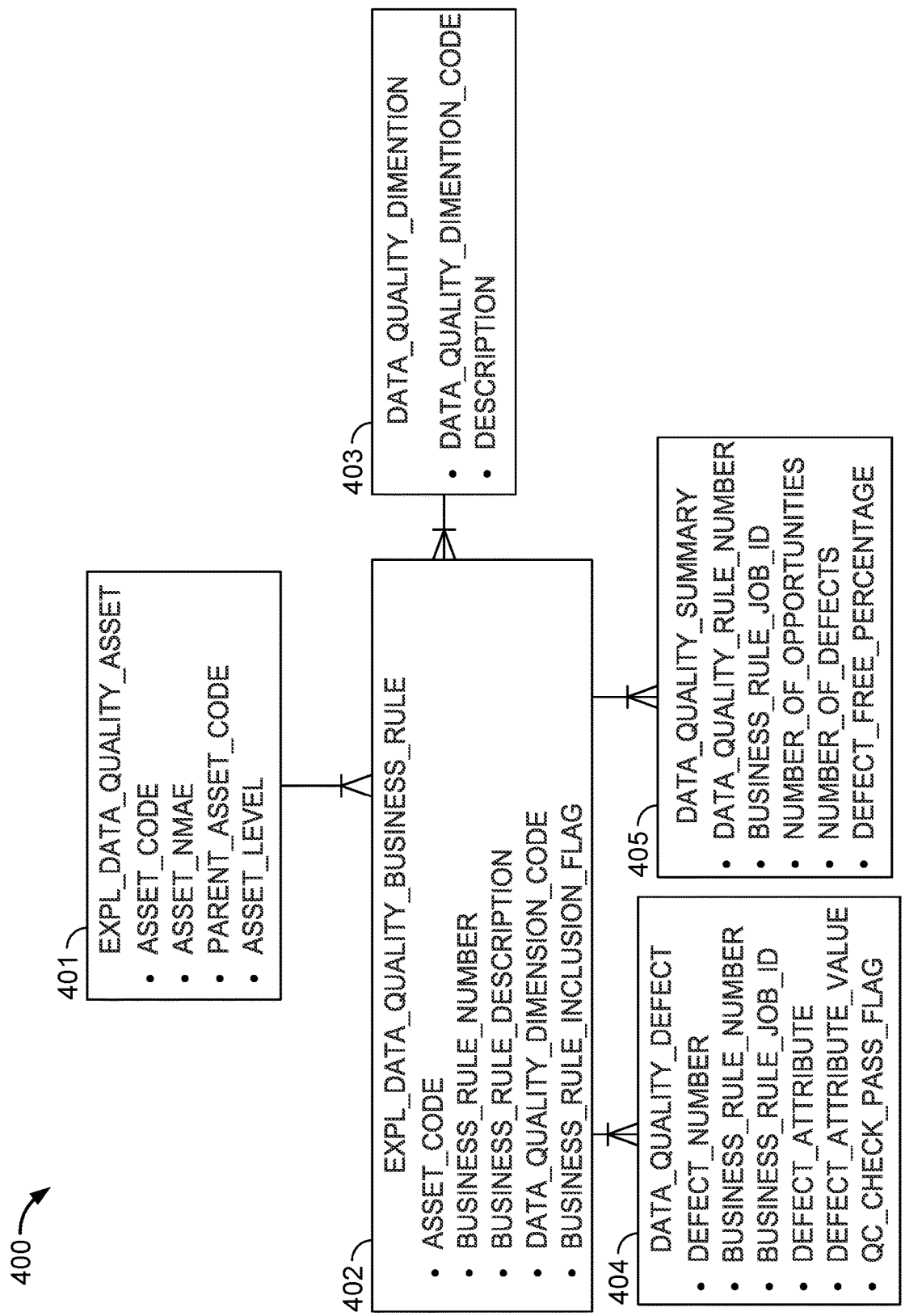
FIG. 4 shows an example of tables of data quality rules for managing data assets according to some implementations of the present disclosure.

Implementations may use an inter-connected set of tables, also known as a schema, to specify the tree structure 300 of FIG. 3. Further referring to FIG. 4, diagram 400 shows an interconnected set of tables 401, 402, 403, and 404 that implement the data model and the data quality rules to enforce data quality of a geophysical exploration data asset. Table 401 describes the exploration data quality asset, with attributes of asset name, asset name, parent asset code, and asset level. Table 402 describes exploration data quality business rule, with attributes of asset code, business rule number, business rule description, data quality dimension code, and business rule inclusion flag. Table 403 describes data quality dimension with attributes of data quality dimension code and description. Table 404 describes data quality defects with attributes of defect number, business rule number, business rule job ID, defect attribute, defect attribute level, and QC check pass flag. Table 405 describes data quality summary with attributes of data quality rule number, business rule job ID, number of opportunities, number of defects, and defect-free percentage. Details of the attributes can be found in FIGS. 5-6 and the associated descriptions. Tables 404 and 405 build on table 402, which in turn, builds on tables 401 and 403.

Figure 5A:
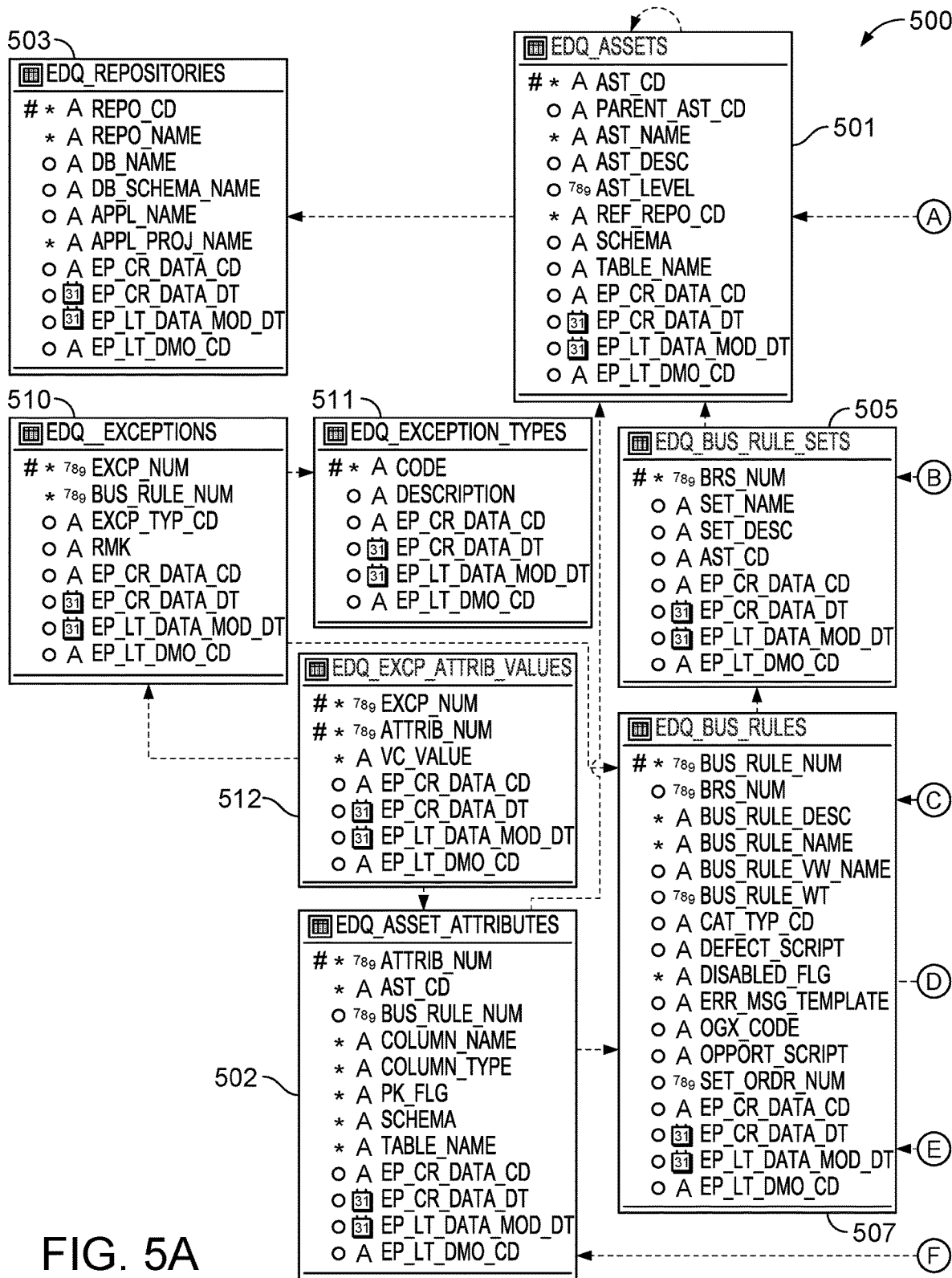
FIG. 5A shows another example of tables of metadata of data assets and data quality rules for managing the data assets according to some implementations of the present disclosure.
Figure 5A:
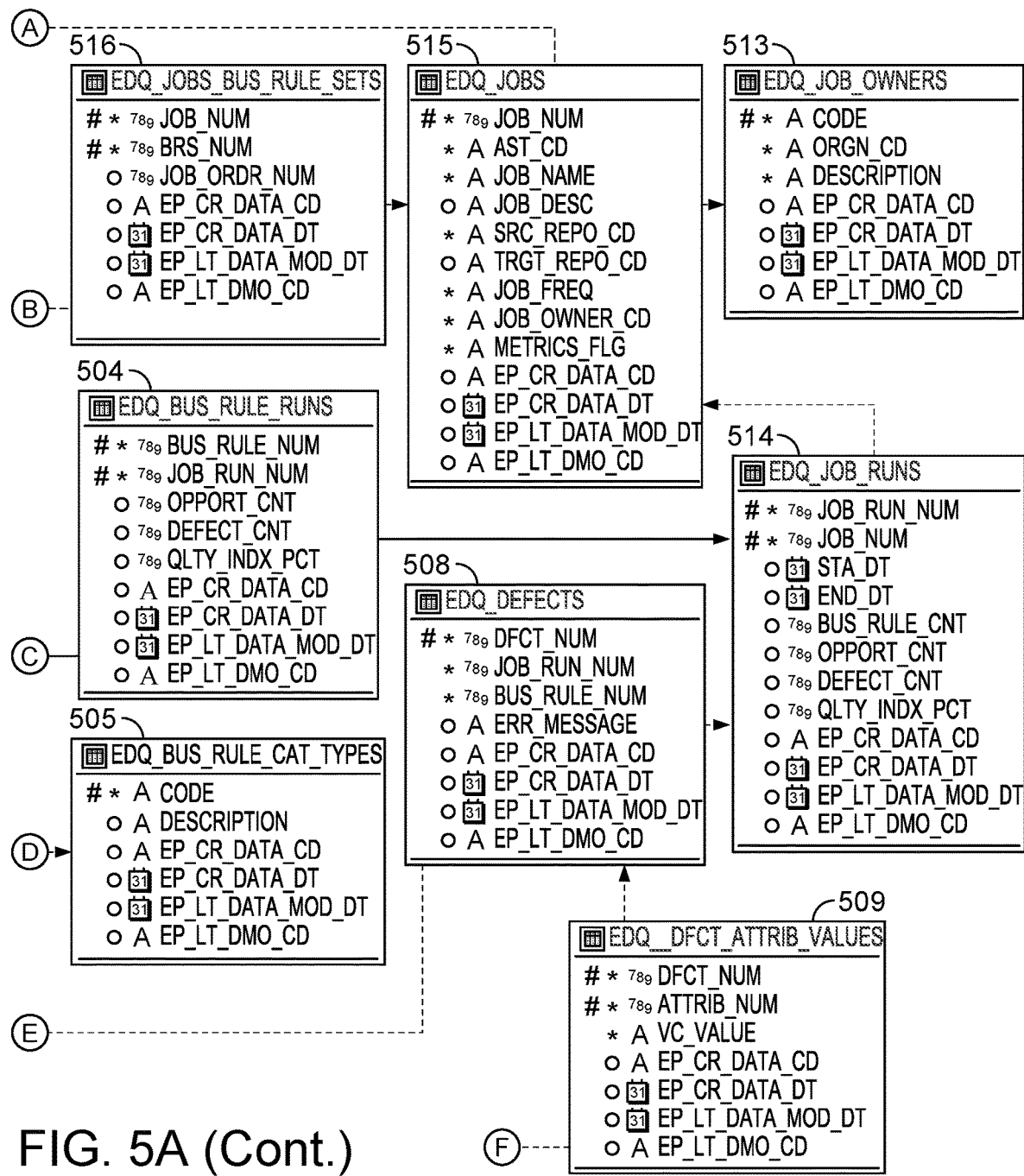
Figure 5B:
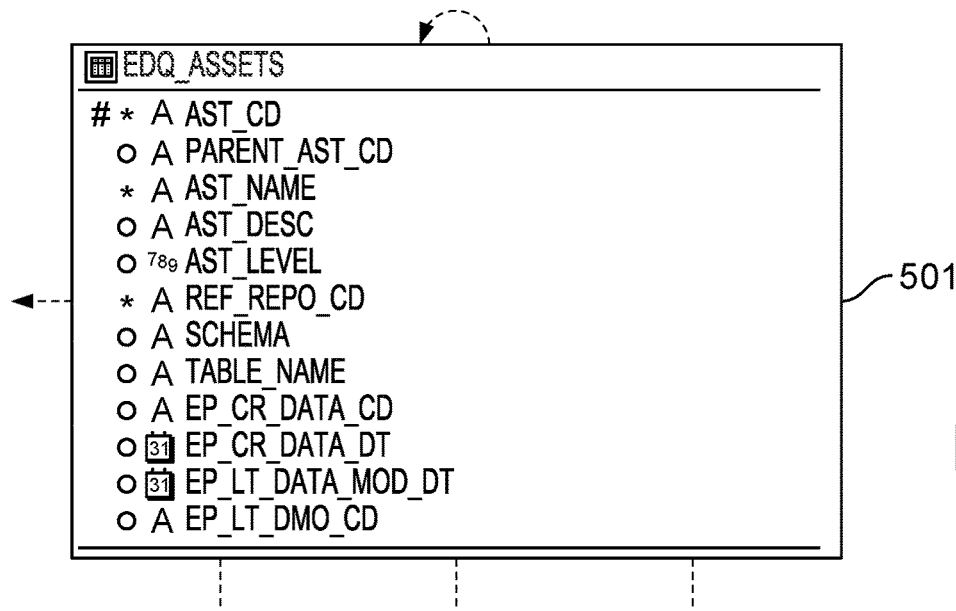
FIGS. 5B to 5Q show each of the fifteen (15) components of the tables of FIG. 5A.
Figure 5C:
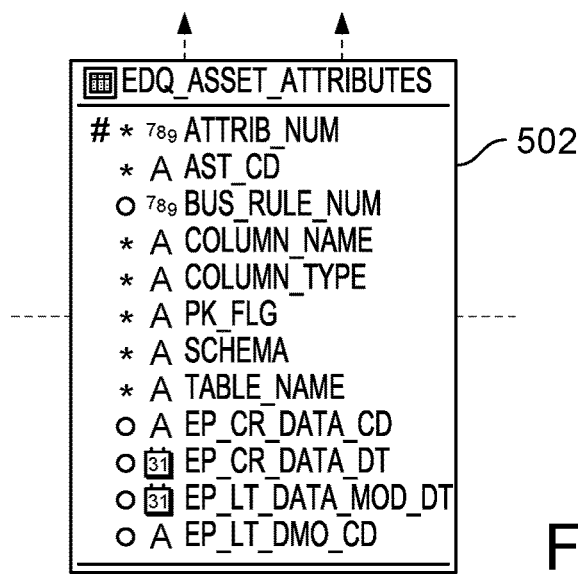
Figure 5D:
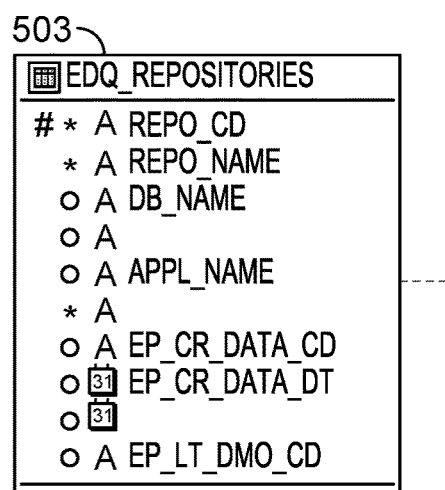
Figure 5E:
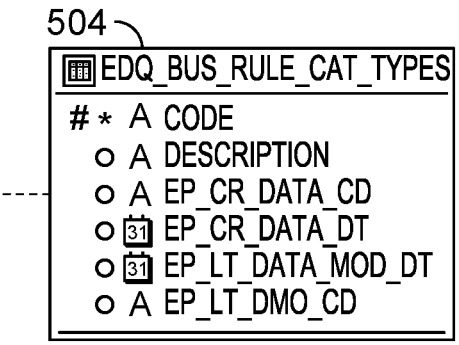
Figure 5F:
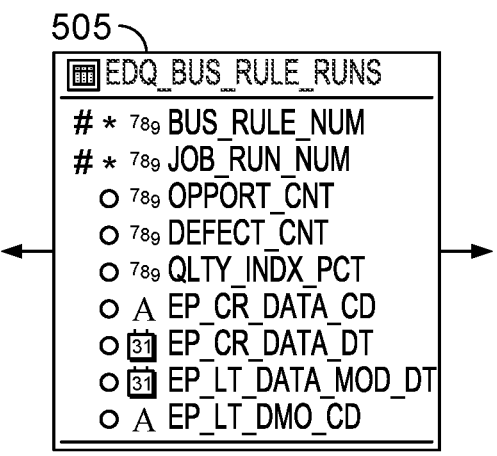
Figure 5G:
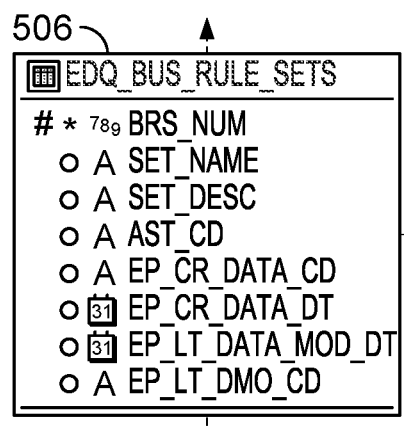
Figure 5H:
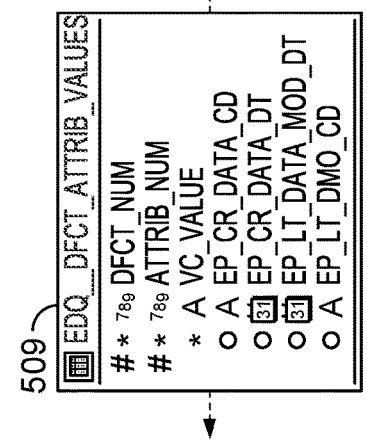
Figure 5I:
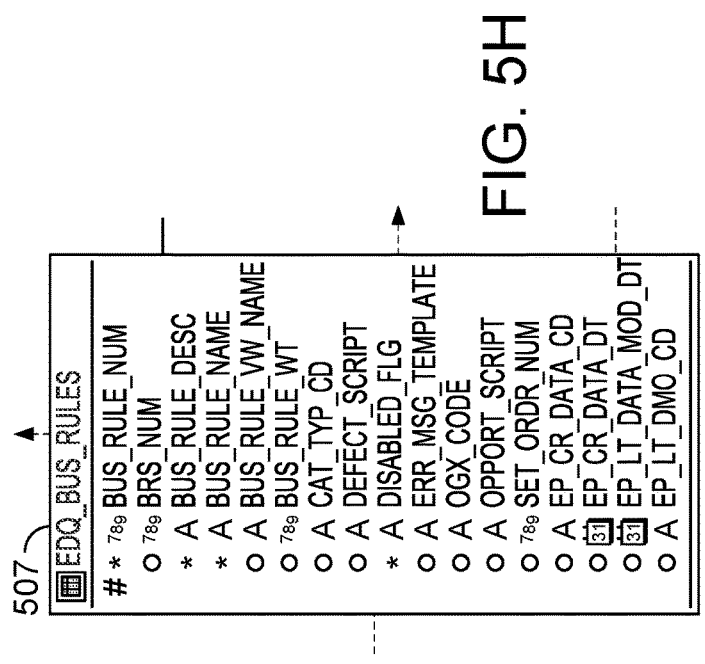
Figure 5J:
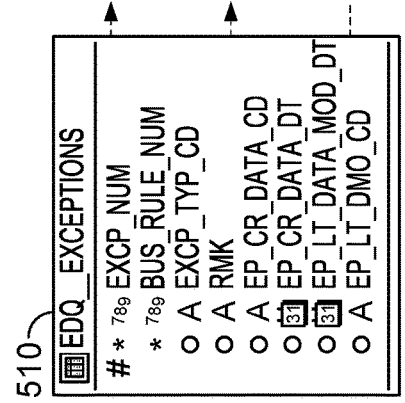
Figure 5K:
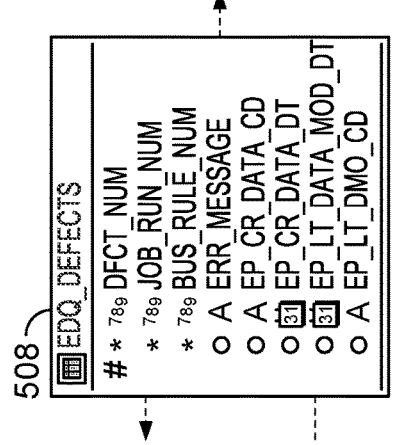
Figure 5L:
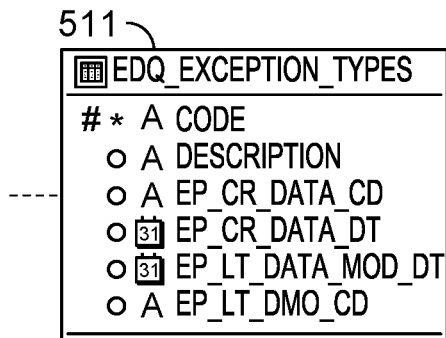
Figure 5M:
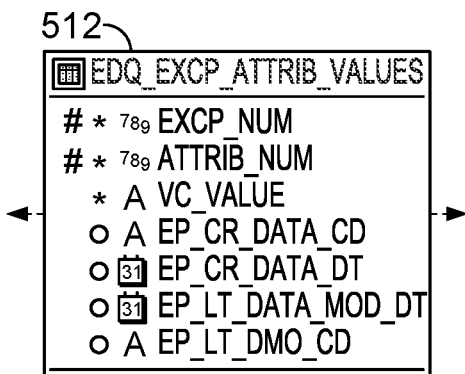
Figure 5N:
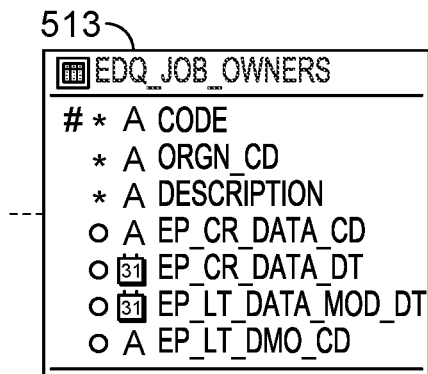

Referring to FIG. 5A, diagram 500 shows a total of sixteen tables describing a dynamic model. In this illustration, the sixteen tables store information encoding attributes of exploration data assets. These attributes can be dynamically maintained along with the data quality rules. Some implementations may implement the data quality rules in SQL, which can be executed in batch jobs independent of the underlying database supplier. These implementations can provide a well-organized and scalable approach that meets the challenge of managing exploration data assets that are voluminous and dynamically changing.

Table 501 shows the table of EDQ_ASSETS, which is a table that contains information about the exploration data assets, also known as data types. As illustrated, table 501 identifies each data type or asset with a unique record and stores the full name of that type or asset along with its description. Table 501 also records the repository in which each data type or asset is stored. In addition, table 501 correlates data assets or types in the form of parent-child relationship at multiple levels for each data type or asset to establish hierarchal classification of data assets. Additionally, table 501 contains the name of the main table and schema of the database in which each data type or asset is stored. The information in the table of EDQ_ASSETS offers a well-designed taxonomy that organizes data assets into multi-level hierarchical relationships and descriptive metadata to discover and search for data assets in the corresponding repositories effectively. As illustrated, table 501 links the data assets with their repositories in the table of EDQ_REPOSITORIES that defines the repository in which each data type or asset is being stored. This relationship can further allow recordation of the name of the repository, name of the application project, or the database name along with scheme in which the repository data reside. Table 501 is also linked with the tables of EDQ_ASSET_ATTRIBUTES and EDQ_BUS_RULE_SETS. The former contains the metadata about the attributes of data assets or types on which data quality check will be calculated so that defects will be assessed and identified accordingly. The latter defines the set of data quality business rules to be applied on each data asset or type. Table 501 is also connected with the table of EDQ_JOBS that logs information every time a job runs on data assets based on sets of data quality business rules. This connectivity offers the capability to include metrics capable of monitoring the progress of data quality over time on a data type or asset separately, on a set of data assets or types in the aggregate, or at a certain level of the hierarchical classification of data assets and types.

Table 502 shows the table of EDQ_ASSET_ATTRIBUTES, which is a table that contains metadata about the attributes of the data assets. For example, table 502 tabulates the specific tables and columns of assets whose values need to be captured so that when a data asset fails a data quality check, only these specific tables/columns are captured. Specifically, table 502 contains information about the list of attributes for each data asset or type. The information includes the table and schema of the database in which each attribute of that data type or asset is stored. In various implementations, the list attributes associated with each data type or asset can be updated dynamically on-demand and the data model thus can reflect the latest data quality check each data asset or type, including the calculations of quality check. Such capability of a dynamic data quality model is a remarkable improvement over conventional database tools for managing geo-exploration data. Indeed, the implementations provides a scalable and flexible approach that allows dynamic updates of the set of attributes for each data type instantly and separately. The results of the data quality check and relevant calculations also still include the latest list of attributes for data type or asset. In addition, the defects are assessed and identified base on that latest list of attributes immediately after changes take place.

Table 503 shows the table of EDQ_REPOSITORIES, which is a table that lists the data repositories whose data quality can be benchmarked. In some cases, the data quality can be measured in an absolute sense. Additionally, or alternatively, the data quality can be measured in a relative sense by comparing between two repositories. Specifically table 503 uniquely identifies a data repository where exploration assets are stored with a code. For example, table 503 stores the name of the repository, name of the application project, or the oracle database name along with scheme in which the repository data reside. This configuration can define one or more repositories for data types or assets on which one or more sets of data quality rules apply and results are calculated as well defects assessed and identified. In some implementations, the table may only be linked to EDQ_ASSETS to keep records of the repositories to which each data asset or type is being stored.

Table 504 shows the table of EDQ_BUS_RULE_CAT_TYPES, which is lookup table that list the data quality (sometimes shorthanded as business) rules categories such as accuracy, validity, timeliness, etc. In some implementations, table 504 can classify which of categories each data quality rule applies. These implementations mainly operate to mandatorily classify each of the data quality rule in EDQ_BUS_RULES into one of the categories or dimensions so that each data quality rule assesses and identifies the defected data that fall on that category accordingly.

Table 505 shows the table of EDQ_BUS_RULE_RUNS, which provides a link table between EDQ_BUS_RULES and EDQ_JOB_RUNS to keep track of the number of jobs run for each business rule. In particular, table 505 can record the historical statistics for all jobs runs for each data quality rule separately and for the set of data quality rules in the aggregate. For example, table 505 can store the number of defects found by a particular job, the number of opportunities checked by the job and quality index percentage. Table 505 thus provides the capability for producing periodic overall statistical summary for all job runs or specific data type or asset. As illustrated, table 505 is also linked to one additional table to identify owner of the job as an entity within an organization.

Table 506 shows the table of EDQ_BUS_RULE_SETS, which contains information about sets of data quality rules, also referred to as business rules. Grouping data quality rules in sets can allow the rules to be accessed in a particular order and to establish a dependency of the rules. By way of illustration, table 506 can define one or more sets of data quality rules to apply on a data type or asset currently stored in one or more repositories. In this illustration, implementations using table 506 can perform data quality check to assess and identify the defected data where those sets apply and calculate the associated data quality measurement to order determine the level of data quality on that data type. This illustration of table 506 can interact with EDQ_ASSETS where data types are defined, EDQ_BUS_RULES in which business rules are stored and DQ_JOBS_BUS_RULE_SETS that contains information about the business rules sets that are run by jobs. Table 506 offers the feature to define and select various sets of different business rules to be applied on certain data types from the complete list of data types or assets.

Table 507 shows the table of EDQ_BUS_RULES, which is a table that information about the data quality business rules. As illustrated, table 507 can contain details of each data quality rule that determines a data quality constraint or requirement that applies on numerous aspects of data being measured. Table 507 can work with EDQ_BUS_RULE_SETS where many set of business rules can be grouped to be applied on specific data type or asset in one or more repositories, including (i) EDQ_BUS_RULE_RUNS which provides a link table between EDQ_BUS_RULES and EDQ_JOB_RUNS to keep track of the number of jobs run for each business rule, (ii) EDQ_ASSET_ATTRIBUTES where the attributes of data assets or types are stored, and (iii) EDQ_EXCEPTIONS that information about assets that should not be checked against a particular business rule.

Table 508 shows the table of EDQ_DEFECTS, which is a table that tabulates information about the identified defects, for example, the asset instances that have failed data quality checks. As illustrated, table 508 stores the defects that have been identified based on the set of data quality rules applies on one or more repositories and tabulates the information on identified defects that have values to the list of attributes defined and updated dynamically for each data asset or types. In this illustration, table 508 works with three tables within the data model, namely, EDQ_JOB_RUNS, EDQ_BUS_RULES and EDQ_DFCT_ATTRIB_VALUES. The table of EDQ_JOB_RUNS provides a link table between EDQ_BUS_RULES and EDQ_JOB_RUNS to keep track of the number of jobs run for each business rule. The table of EDQ_BUS_RULES contains information about data quality business rules. The table of EDQ_DFCT_ATTRIB_VALUES which contains attribute values of defect asset snapshots from data checking. And lastly, the table of EDQ_BUS_RULES contains information about data quality business rules.

Table 509 shows the table of EDQ_DFCT_ATTRIB_VALUES, which is a table that contains the attribute values of the defect asset, as identified in snapshots resulting from data quality checks. As illustrated, table 509 stores values of defect asset with snaps from data checking. In this illustration, table 509 contains values for the list of attributes for each asset defined earlier. Notably, the values can be updated dynamically via the model where the values include the latest list of attributes for each data asset. Table 509 interacts with both tables of EDQ_ASSET_ATTRIBUTES and DQ_DEFECTS. The former contains metadata about asset attributes e.g. details about the tables and columns. Only the columns of an asset whose values need to be captured when an asset fails a data quality check are captured whereas the later contains information about defects e.g. asset instances that failed data quality checks. Table 509 thus acts as the container for all defects with values for the list of attributes dynamically defined or update for data assets or types in the data model.

Table 510 shows the table of EDQ_EXCEPTIONS, which is a table that tabulates business rules exceptions under which, for example, data assets may not be checked against a particular business rule. Table 510 can be used to exempt business rules to apply on data assets due to data quality constraints or restrictions. Table 519 is linked to the table of EDQ_BUS_RULES that contains information about data quality business rules. This feature gives the capability to selectively apply data quality rules on certain list of data assets from the complete list.

Table 511 shows the table of EDQ_EXCEPTION_TYPES, which is a lookup table that lists the types of exceptions for data quality rules. The exception means a situation in which a data quality rule may not be complied with. In other words, the exception is a way to exempt particular records from data quality check. Table 511 thus offers the capability to define the different situations in which the data quality rules are not applied on particular records during data quality assessment. Table 511 also provides the flexibility to update these situations on demand when justified by changes circumstances in data quality requirement.

Table 512 shows the table of EDQ_EXCP_ATTRIB_VALUE, which is a table that contains attribute values of data assets subject to an exception of a data quality rule. As illustrated, table 512 is linked with the table of EDQ_EXCEPTIONS which tabulates data quality rule exceptions under which, data assets may not be checked against a particular business rule. The table 512 thus offer systematic way to keep track of which data asset exempted from a particular business rule from the complete list of asset types.

Table 513 shows the table of EDQ_JOB_OWNERS, which is a lookup table that lists the divisions that can own data quality jobs. In some implementations, the SQL statements prescribing data quality rules can be executed as batch jobs by an operator, who is often times the owner of the batch job. As illustrated, table 513 contains the code and name of the organizational entity identified as the job owner, thereby offering a systematic way on keeping track of numerous jobs for data quality check by different organizational divisions. In this illustration, table 513 is linked with EDQ_JOBS that contains information about data quality jobs such as the frequency of the jobs, the asset whose quality is being checked, and the repositories where such data asset resides.

Table 514 shows the table of EDQ_JOB_RUNS, which is a table that logs information every time a job runs. Table 514 can include metrics that allow monitoring of the progress of data quality over time. As illustrated, the log of information for each job includes the data quality rule count recognizing a number of data quality rules run by the job, the defect count showing the number of defects identified by the job, start and end dates for the job along with its number, and lastly the opportunity count determining the number of opportunities checked by the job. The table 514 thus offers the capability to generate periodic historical statistics on certain data type or asset separately or the set of data assets or types in the aggregate. The historical statistics can be based on a particular criteria or at a particular level from the hierarchical classification of data assets or types. Table 514 works with the table of EDQ_JOBS that contains information about data quality jobs such as their frequency, the asset whose quality is being checked, the repositories where such asset resides.

Table 515 shows the table of EDQ_JOBS, which is a table that contains information about data quality jobs such as the frequency/incident of the data quality batch jobs, the asset whose quality is being checked, and the repositories where it is checked. In some implementations, table 515 offers systemic way to keep track of the history of which data quality batch jobs have been run for data assets on the associated repositories by different divisions within an organization. As illustrated, table 515 may be linked directly with the tables of EDQ_JOBS_BUS_RULE_SETS and EDQ_JOB_OWNERS within the data model. The former contains information about the business rules sets that are run by jobs whereas the later lists the divisions as owners of the data quality jobs.

Table 516 shows the table of EDQ_JOBS_BUS_RULE_SETS, which is a table that contains information about the business rules sets that are run by, for example, the batch jobs. As illustrated, table 516 offers a systemic way to keep track of history of which business rules run sets run by batch jobs for data assets. In this illustration, table 516 is linked directly with the tables of EDQ_BUS_RULE_SETS and EDQ_JOBS within the data model. The former contains information about sets of data quality business rules and specifically groups data quality business rules in sets so that the rules can be checked in a particular order and making these rules dependent on each other whereas the latter contains information about data quality jobs such as the frequency, the asset whose quality is being checked, the repositories where such asset resides.

Some implementations provide a method to apply a data quality rule for measuring a specific data type by defining the condition (e.g. values of a specific record cannot overlap with the neighboring record), and then translating the condition into a SQL query which, when executed (e.g., as a batch job on a RDBMS system), can identify the assets that fail to meet the condition. The results of the identification can be stored in the data quality model and reported for operator inspection.

Figure 6A:
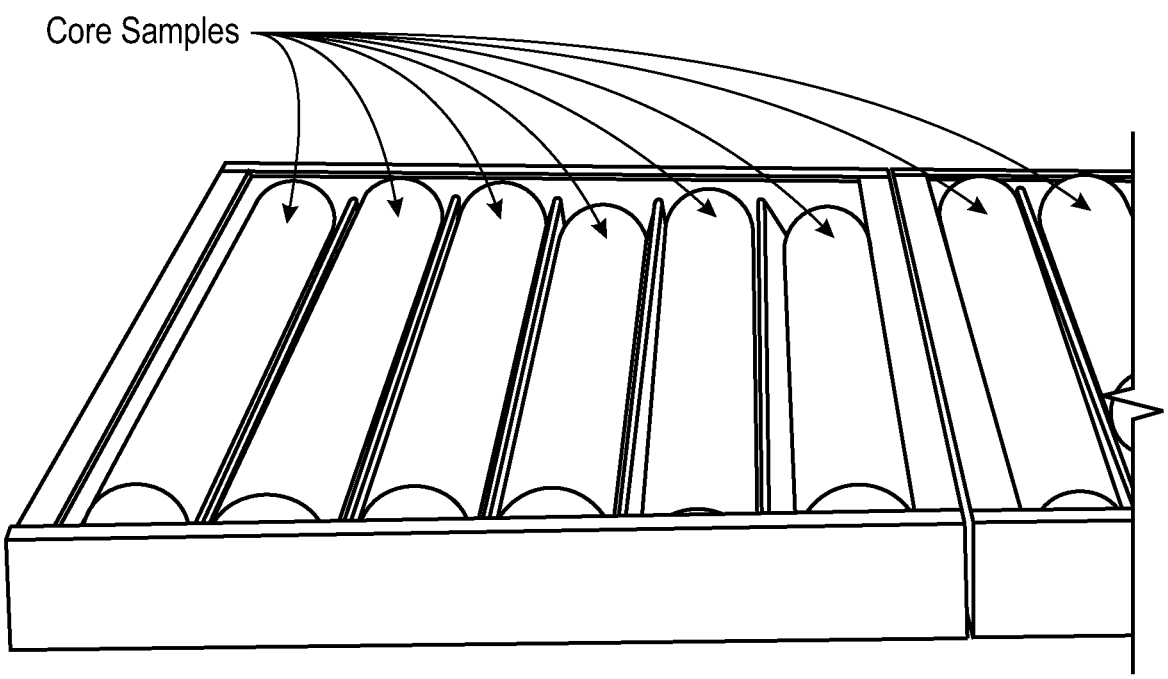
FIG. 6A shows examples of core samples with markings indicating the various depths as described in some implementations of the present disclosure.
Figure 6B:
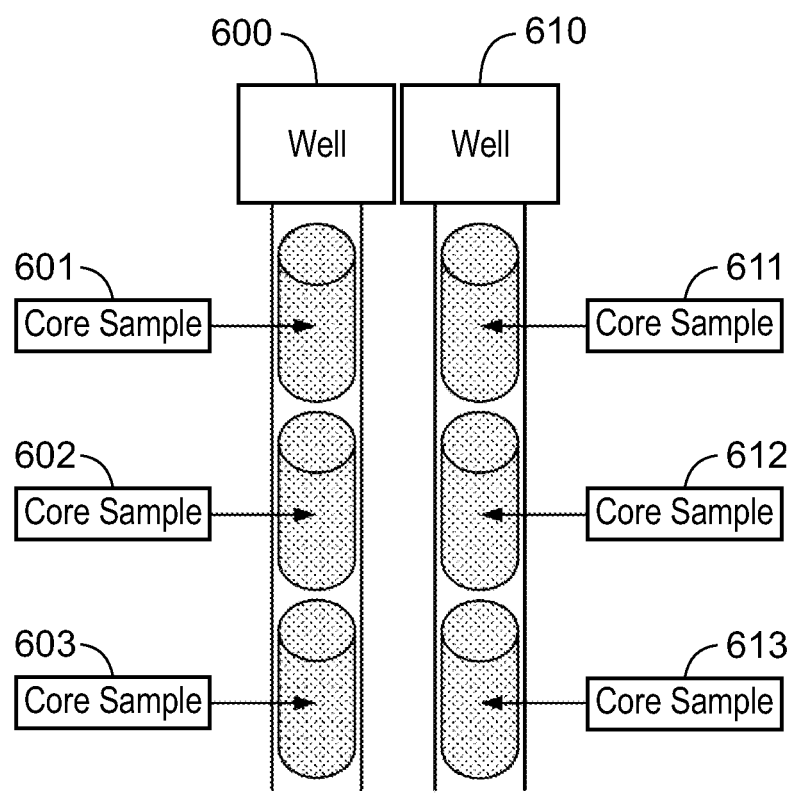
FIG. 6B illustrates an example of six core samples obtained from various depths of two wells as described in some implementations of the present disclosure.

FIGS. 6A and 6B describe a use case example of core samples. A core sample is a cylindrical section of the earth extracted from a wellbore utilizing special drilling equipment during a drilling operation. As illustrated in FIG. 6A, the core samples are cylindrical in shape, each marked by a label and associated with a well. FIG. 6B further illustrates core samples 601, 602, 603 extracted from well 600 at a corresponding depth, and core samples 611, 612, and 613 extracted from well 610 at a corresponding depth. Each core sample has a particular length. When the core samples are brought back to the core storage/lab, the core lab technicians are expected to enter the information of each core in the database. The process is prone to errors which give rise to missing or incomplete information for the various core samples. For this reason, continuous monitoring can be advantageous to maintain data quality. For example, always, core sample 601 is expected to be at shallower depth than the subsequent core samples 602 and 603. However, if core sample 601 starts at 100 ft and ends at 200 ft, then the following core samples 602 and 603 are not expected to start at 199 ft because no such overlap would be physically consistent. However, the process may open the door to erroneous data entry when, for example, the person responsible for entering core sample information in the database enters incorrect depth information. The table below show how 'CORESAMPLE' records are stored with different cases of data quality issues.

TABLE 1

| CORE_ID | WELL_NAME | CORE_NUMBER | TOP_DEPTH | BOTTOM_DEPTH | RECOVERED_CORE | CORING_DATE | DRILLING_START |
|---|---|---|---|---|---|---|---|
| 1001 | Well XX | 1 | 100 | 200 | 90 | Jun. 22, 2008 | May 14, 2018 |
| 1002 | Well XX | 2 | 199 | 300 |  | Jul. 24, 2018 | May 14, 2018 |
| 1003 | Well XX | 3 | 310 | 405 |  | Aug. 5, 2018 | May 14, 2018 |
| 1004 | Well YY | 1 | 550 | 610 | 70 |  | Jul. 22, 2019 |
| 1005 | Well YY | 2 | 610 | 690 | 70 |  | Jul. 22, 2019 |
| 1006 | Well YY | 3 | 700 | 660 | 50 |  | Jul. 22, 2019 |

If core sample information is stored in a table named 'CORESAMPLE', the data quality rules can be translated to a SQL query that finds the cases where records in the table 'CORESAMPLE' are not meeting the data quality rule and flag these records of CORESAMPLE as defects. 'CORE SAMPLE' is an example to illustration an implementation. The methodology can be utilized to measure various data stored in a database regardless of whether the data asset is for a well, a reservoir, a field or a seismic related asset.

For example, each core sample in Table 1 can be taken from a range with a starting depth and an ending depth. Each core sample has a particular length. One data quality rule can specify that the starting depth of the range in which a core sample (e.g., core sample 602) is taken may not be smaller than the ending depth of the preceding core sample (e.g., core sample 601). Another data quality rule can state that the length of a core sample may not exceed the range from which the core sample is taken. Indeed, for the data store in the illustrative Table 1, multiple data quality rules can be generated to evaluate the quality of 'CORESAMPLE' data in the database. Specifically, a SQL query can be created to identify the records that fail to comply with a data quality rule, as illustrated below.

Example 1: For each individual core id, the bottom depth is always equal to or larger than top depth. This rule can be expressed by the following SQL query statement:

Select*from (select*from CORESAMPLE) where TOP_DEPTH>BOTTOM_DEPTH

Running the SQL query reveals the following identified defects:
1 detect CORE_ID 1006 (TOP_DEPTH 700 larger than BOTTOM DEPTH 660)

Additionally, running the SQL query can generate the following measured quality metric of the percentage of data assets that satisfy the data quality rule:

(1−(1/6))*100=83.33%

Example 2: For each individual core id, recovered core information needs to be populated. This rule can be expressed by the following SQL query statement:

Select*from (select*from CORESAMPLE) where RECOVERED_CORE is NULL

Running the SQL query reveals the following identified defects:
2 defects CORE_ID 1002 and 1003 (both have null RECOVERED_CORE).

Additionally, running the SQL query can generate the following measured quality metric of the percentage of data assets that satisfy the data quality rule:

(1−(2/6))*100=66.67%

Example 3: For each individual core id, recovered core is always equal to or smaller than the total coring depth. This rule can be expressed by the following SQL query statement:

Select*from (select*from CORESAMPLE) where RECOVERED_CORE>BOTTOM_DEPTH−TOP_DEPTH Running the SQL query reveals the following identified defects:
2 detects CORE_ID 1004 and 1006 (70 larger than 610−550 and 50 larger than 660−700.

Additionally, running the SQL query can generate the following measured quality metric of the percentage of data assets that satisfy the data quality rule:

(1−(2/6))*100=66.67%

Example 4: For each individual core id, coring date information needs to be populated. Coring date indicates the date on which the core sample was taken. This rule can be expressed by the following SQL query statement:

Select*from (select*from CORESAMPLE) where CORING_DATE is NULL

Running the SQL query reveals the following identified defects:
3 detects CORE_ID 1004, 1005 and 1006 (all have null CORING_DATE).

Additionally, running the SQL query can generate the following measured quality metric of the percentage of data assets that satisfy the data quality rule:

$$(1-(3/6))*100=50\%$$

Example 5: For each individual core id, coring date is always equal to or after the drilling start date. This rule can be expressed by the following SQL query statement:

Select*from (select*from CORESAMPLE) where CORING_DATE is NULL

Running the SQL query reveals the following identified defects:
1 defect CORE_ID 1001 (Jun. 22, 2008 is before May 14, 2018).

Additionally, running the SQL query can generate the following measured quality metric of the percentage of data assets that satisfy the data quality rule:

$$(1-(2/6))*100=66.67\%$$

Example 6: For the same well, bottom depth of the core sample with the smaller number must be smaller than or equal to the top depth of the core with the larger number. This rule can be expressed by the following SQL query statements:

Select*from (select
cm1.WELL_NAME,
cm1.CORE_ID as SHALLOWER_CORE_ID,
cm1.CORE_NUMBER as SHALLOWER_CORE_NUMBER,
cm2.CORE_ID as DEEPER_CORE_ID
cm2.CORE_NUMBER as DEEPER_CORE_NUMBER,
cm1.TOP_DEPTH as SHALLOWER_CORE_TOP_DPTH,
cm1.BOTTOM_DEPTH as SHALLOWER_CORE_BOTTOM_DPTH,
cm2.TOP_DEPTH as DEEPER_CORE_TOP_DPTH,
cm2. BOTTOM_DEPTH as DEEPER_CORE_BOTTOM_DPTH
from CORESAMPLE cm1, CORESAMPLE cm2
where cm1.WELL_NAME=cm2.WELL_NAME
and (cm2.CORE_NUMBER−cm1.CORE_NUMBER)=1)
--Defect Condition
WHERE DEEPER_CORE_TOP_DPTH≤SHALLOWER_CORE_BOTTOM_DPTH The outcome of this query will be 1 defected core sample record combining CORE_ID 1001 and CORE_ID 1002. The Opportunity in this case are all the combinations of different neighboring core samples within the same well, covering both Well 601 and Well 610.

Additionally, running the SQL query can generate the following measured quality metric of the percentage of data assets that satisfy the data quality rule:

$$(1-(1/4))*100=75.00\%$$

In the above examples, the asset quality of CORE_SAMPLE can be calculated as: Asset quality of CORE_SAMPLE=(88.33+66.67+66.67+50+66.67+75)/6=68.89%

In the example above, all records in the table 'CORESAMPLE' are defined as Opportunity while records that fail to meet the business rule are marked defects. In the above examples, the main query for a quality business rule is written in the form "SELECT*FROM (OPPORMINTY_SCRIPT) WHERE DEFFECT_CONDITION". The query is then parsed to produce the following results for the business rule:

1. Defected Records:
SELECT*FROM (OPPORITINTY_SCRIPT) WHERE DEFFECT_CONDITION
2. Count of Defected Records:
SELECT COUNT(*) FROM (OPPORTUINTY_SCRIPT) WHERE DEFFECT_CONDITION
3. Count of Total Records (Opportunity):
SELECT COUNT(*) FROM (OPPORTUNITY_SCRIPT)
4. Business Rule Quality Percentage:

$$Quality=(1-(Count\ of\ Defected\ Records/Count\ of\ Total\ Records))*100$$

5. Asset data quality
Asset data quality=Avg(ΣQuality Percentages from each business rule designated for the asset)

Various implementations can leverage the dynamic model to identify, either on-demand or regularly, defects ranging from relatively simple missing values in a record or relatively more complex overlap of core sample locations. The implementations can alert data custodians or stakeholders of the measurements and the identified defects so that the defects can be resolved, or the underlying data can be marked as an exception to a data quality rule (e.g. when the data asset involves legacy data with no available records). In some cases, the implementations may update the data quality rule in view of the situation. In any event, data managers can continue to monitor the progress of each data type and report whether progress has been made to remedy the situation.

Figure 7:
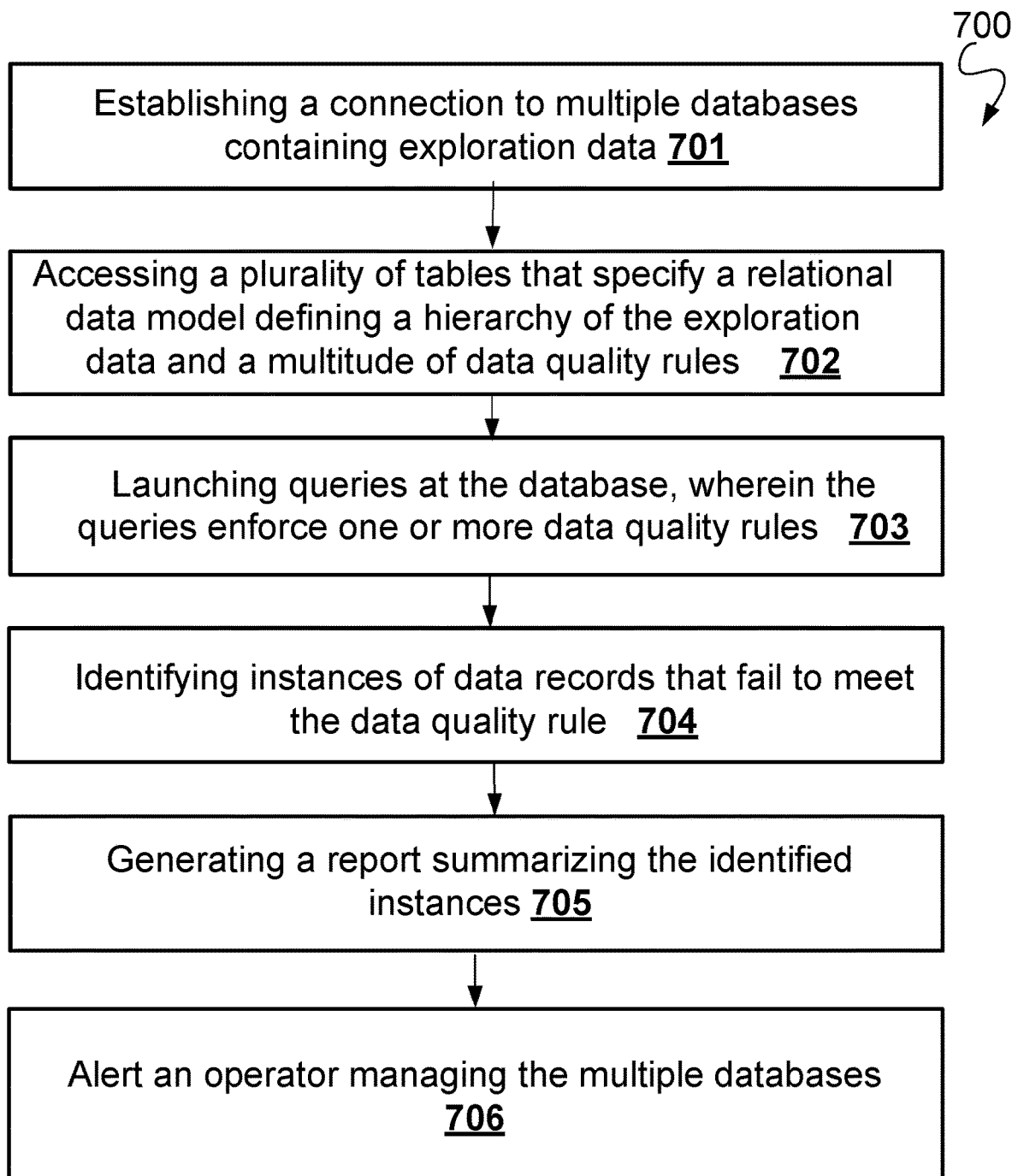
FIG. 7 is an example of a flow chart according to an implementation of the present disclosure.

As illustrated by the flow chart 700 of FIG. 7, some implementations may provide a computer-implemented process. Initially, the flow chart 700 may start with establishing a connection with multiple databases (701), each containing data records obtained from drilling operations. As discussed earlier in association with, for example, FIG. 3 the data records can capture various aspects of geo-physical exploration including, for example, a tree-structure well parameters, a tree-structured subsurface parameter, and a tree-structured surface geology parameters. Each tree-structured data asset can include additional branches with added hierarchy. In other words, the hierarchy can be adapted to a specific drilling operation. For example, for a data asset of core samples taken from a particular well, the data asset can be based on tree-structure well object to include, for example, location of the well, timing of each drilling, the depth and ranges where the core samples are taken, specific dimensions of each core sample, etc. The connection can be a logic connection, which can include multiple and simultaneous communication with the multiple databases.

Some implementations can access a multitude of tables that describe a data relational model and a hierarchical classification of the exploration data assets (702). Specifically, the dynamic model defines the data assets, the list of attributes associated with each data asset, as well as data quality rules to apply on each data asset to perform data quality check and to perform the data quality measurements regularly from the lowest level of data assets to the highest level of the data asset. In some cases, the implications can normalize the multiple databases according to the dynamic model to streamline data storage and data access. As detailed in FIG. 5, some implementations can resort to a total of 16 tables that store information about the hierarchy and the attributes of the exploration data asset along with the data quality rules, which can be written in SQL. The collection of tables, also known as a schema, presents a very well organized and scalable approach that meets changing business requirements.

The implementations may then query the multiple databases according to one or more data quality rules (703). Each data quality rule can be written in SQL statements to enforce, for example, constraints of the underlying data. As described in more detail in FIGS. 6A-6B, examples of the data quality rules can specify that the starting depth of the range in which a core sample is taken may not be smaller than the ending depth of the preceding core sample, Additionally, or alternatively, the length of a core sample may not exceed the range from which the core sample is taken.

The implementations may then identify instances of data records from the multiple databases that fail to meet the data quality rule (704). The examples from FIGS. 6A-6B also demonstrate the identification of instances of particular data records from a given database that fail to meet a given data quality rule. Subsequently, the implementations may generate a report summarizing the identified instances (705). The summary can include various quantitative metrics, as outlined above in discussions associated with FIGS. 1, 2B, 6A-6B. The implementations may then alert an operator managing the multiple databases (706). As demonstrated by the examples associated with FIGS. 6A-6B, the measurements and the identified defects can be shared with operators. The alert may result in the defects being fixed, or flagged as exception to the data quality rule. In some cases, the data quality rule can also be updated in view of the situation. Some implementations can continue to monitor the progress of each data type in subsequent data queries.

Figure 8:
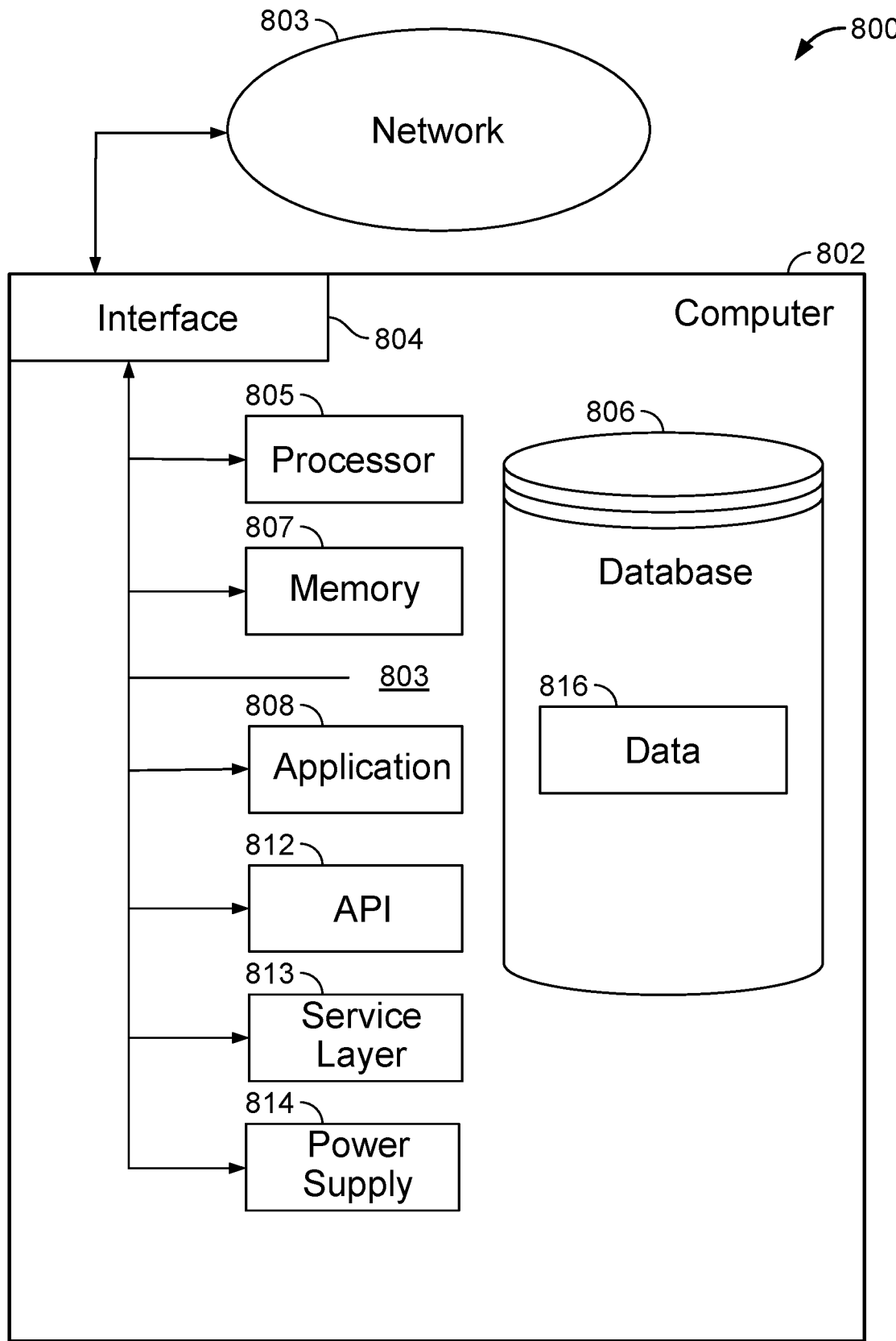
FIG. 8 is a block diagram illustrating an example of a computer system used to provide computational functionalities associated with described algorithms, methods, functions, processes, flows, and procedures, according to an implementation of the present disclosure.

FIG. 8 is a block diagram illustrating an example of a computer system 800 used to provide computational functionalities associated with described algorithms, methods, functions, processes, flows, and procedures, according to an implementation of the present disclosure. The illustrated computer 802 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 802 can comprise a computer that includes an input device, such as a keypad, keyboard, touch screen, another input device, or a combination of input devices that can accept user information, and an output device that conveys information associated with the operation of the computer 802, including digital data, visual, audio, another type of information, or a combination of types of information, on a graphical-type user interface (UI) (or GUI) or other UI.

The computer 802 can serve in a role in a computer system as a client, network component, a server, a database or another persistency, another role, or a combination of roles for performing the subject matter described in the present disclosure. The illustrated computer 802 is communicably coupled with a network 803. In some implementations, one or more components of the computer 802 can be configured to operate within an environment, including cloud-computing-based, local, global, another environment, or a combination of environments.

The computer 802 is an electronic computing device operable to receive, transmit, process, store, or manage data and information associated with the described subject matter. According to some implementations, the computer 802 can also include or be communicably coupled with a server, including an application server, e-mail server, web server, caching server, streaming data server, another server, or a combination of servers.

The computer 802 can receive requests over network 803 (for example, from a client software application executing on another computer 802) and respond to the received requests by processing the received requests using a software application or a combination of software applications. In addition, requests can also be sent to the computer 802 from internal users, external or third-parties, or other entities, individuals, systems, or computers.

Each of the components of the computer 802 can communicate using a network 803 (or system bus). In some implementations, any or all of the components of the computer 802, including hardware, software, or a combination of hardware and software, can interface over the network 803 (or system bus) using an application programming interface (API) 812, a service layer 813, or a combination of the API 812 and service layer 813. The API 812 can include specifications for routines, data structures, and object classes. The API 812 can be either computer-language independent or dependent and refer to a complete interface, a single function, or even a set of APIs. The service layer 813 provides software services to the computer 802 or other components (whether illustrated or not) that are communicably coupled to the computer 802. The functionality of the computer 802 can be accessible for all service consumers using this service layer. Software services, such as those provided by the service layer 813, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 802, alternative implementations can illustrate the API 812 or the service layer 813 as stand-alone components in relation to other components of the computer 802 or other components (whether illustrated or not) that are communicably coupled to the computer 802. Moreover, any or all parts of the API 812 or the service layer 813 can be implemented as a child or a sub-module of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802. The interface 804 is used by the computer 802 for communicating with another computing system (whether illustrated or not) that is communicatively linked to the network 803 in a distributed environment. Generally, the interface 804 is operable to communicate with the network 803 and comprises logic encoded in software, hardware, or a combination of software and hardware. More specifically, the interface 804 can comprise software supporting one or more communication protocols associated with communications such that the network 803 or interface's hardware is operable to communicate physical signals within and outside of the illustrated computer 802.

The computer 802 includes a processor 805. Although illustrated as a single processor 805 in FIG. 8, two or more processors can be used according to particular needs, desires, or particular implementations of the computer 802. Generally, the processor 805 executes instructions and manipulates data to perform the operations of the computer 802 and any algorithms, methods, functions, processes, flows, and procedures as described in the present disclosure.

The computer 802 also includes a database 806 that can hold data for the computer 802, another component communicatively linked to the network 803 (whether illustrated or not), or a combination of the computer 802 and another component. For example, database 806 can be an in-memory, conventional, or another type of database storing data consistent with the present disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases of similar or differing types can be used according to particular needs, desires, or particular implementations of the computer 802 and the described functionality. While database 806 is illustrated as an integral component of the computer 802, in alternative implementations, database 806 can be external to the computer 802. As illustrated, the database 806 holds the previously described data 816 including, for example, exploration data assets retained at the repositories of FIG. 1 and databases.

The computer 802 also includes a memory 807 that can hold data for the computer 802, another component or components communicatively linked to the network 803 (whether illustrated or not), or a combination of the computer 802 and another component. Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 or similar or differing types can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in the present disclosure. For example, application 808 can serve as one or more components, modules, or applications. Further, although illustrated as a single application 808, the application 808 can be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or another power management functionality). In some implementations, the power-supply 814 can include a power plug to allow the computer 802 to be plugged into a wall socket or another power source to, for example, power the computer 802 or recharge a rechargeable battery.

There can be any number of computers 802 associated with, or external to, a computer system containing computer 802, each computer 802 communicating over network 803.

Further, the term "client," "user," or other appropriate terminology can be used interchangeably, as appropriate, without departing from the scope of the present disclosure. Moreover, the present disclosure contemplates that many users can use one computer 802, or that one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/-R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperabley coupled with a hardware processor configured to perform the computer-implemented method or the instructions stored on the non-transitory, computer-readable medium.

What is claimed is:

1. A computer-implemented method, comprising:
    launching one or more scripts in a batch job on a hardware processor, wherein the one or more scripts describe a plurality of tables that store
        (i) metadata that characterize a hierarch of exploration data assets, wherein the hierarchy of exploration data assets comprise databases holding data records obtained from a geophysical exploration when core samples are extracted from a plurality of wells drilled during the geophysical exploration for measurements,
        (ii) metadata that characterize a set of data quality rules, wherein the set of data quality rules specify at least one physical relationship between core samples whose measurements, as obtained from the geophysical exploration, are captured in at least two data records of the databases, and
        (iii) metadata that characterize defects identifiable as defective data records in the databases of the hierarchy of exploration data assets, wherein defective data records fail to comply with the set of data quality rules;
    wherein when the batch job is executed, the hardware processor performs operations of:
        querying the hierarchy of exploration data assets according to one or more data quality rules from the set of data quality rules;
        identifying instances of defective data records that fail to meet the one or more data quality rules;
        based on analyzing the instances of defective data records, calculating one or more data quality metrics for the hierarchy of exploration data assets, wherein the one or more data quality metrics comprise an aggregated statistic measure of defective data records in the databases of the hierarch of exploration data assets; and
        continuously monitoring the one or more data quality metrics for the hierarchy of exploration data assets; and
        in response to the one or more data quality metrics exceeding a threshold, alerting an operator.

2. The computer-implemented method of claim 1, wherein querying the hierarchy of exploration data assets comprises:
    running one or more structured query language (SQL) statements to enforce the one or more data quality rule based on the metadata of the set of data quality rules and the metadata of the hierarchy of exploration data assets.

3. The computer-implemented method of claim 2, wherein the operations further comprise:
    storing, according to the metadata that characterizes the defects, information capable of identifying the instances of defective data records that fail to meet the one or more data quality rules.

4. The computer-implemented method of claim 3, wherein the operations further comprise:
    based on the stored information, calculating one or more data quality metrics for the hierarchy of exploration data assets; and
    monitoring the hierarchy of exploration data assets based on the calculated one or more data quality metrics.

5. The computer-implemented method of claim 2, wherein
the one or more scripts include the one or more structured query language (SQL) statements.

6. The computer-implemented method of claim 5, wherein the plurality of tables further stores metadata of the batch job that characterizes the batch job.

7. The computer-implemented method of claim 6, further comprising:
logging information about the batch job each time the batch job runs such that a progress of the data quality metrics over time can be monitored.

8. A computer system comprising one or more hardware processors configured to perform operations of:
in response to one or more scripts launched as a batch job, querying a hierarchy of exploration data assets according to one or more data quality rules from a set of data quality rules, wherein the one or more scripts describe a plurality of tables that store
(i) metadata that characterize the hierarch of exploration data assets, wherein the hierarchy of exploration data assets comprise databases holding data records obtained from a geophysical exploration when core samples are extracted from a plurality of wells drilled during the geophysical exploration for measurements,
(ii) metadata that characterize the set of data quality rules, wherein the set of data quality rules specify at least one physical relationship between core samples whose measurements, as at least two data records obtained from the geophysical exploration, are captured in at least two data records of the databases, and
(iii) metadata that characterize defects identifiable as defective data records in the databases of the hierarchy of exploration data assets, wherein defective data records fail to comply with the set of data quality rules;
identifying instances of defective data records that fail to meet the one or more data quality rules;
based on analyzing the instances of defective data records, calculating one or more data quality metrics for the hierarchy of exploration data assets, wherein the one or more data quality metrics comprise an aggregated statistic measure of defective data records in the databases of the hierarch of exploration data assets; and
continuously monitoring the one or more data quality metrics for the hierarchy of exploration data assets; and
in response to the one or more data quality metrics exceeding a threshold, alerting an operator.

9. The computer system of claim 8, wherein querying the hierarchy of exploration data assets comprises:
running one or more structured query language (SQL) statements to enforce the one or more data quality rule based on the metadata of the set of data quality rules and the metadata of the hierarchy of exploration data assets.

10. The computer system of claim 9, wherein the operations further comprise:
storing, according to the metadata that characterizes the defects, information capable of identifying the instances of defective data records that fail to meet the one or more data quality rules.

11. The computer system of claim 10, wherein the operations further comprise:
based on the stored information, calculating one or more data quality metrics for the hierarchy of exploration data assets; and
monitoring the hierarchy of exploration data assets based on the calculated one or more data quality metrics.

12. The computer system of claim 9, wherein
the one or more scripts include the one or more structured query language (SQL) statements.

13. The computer system of claim 12, wherein the plurality of tables further stores metadata of the batch job that characterizes the batch job.

14. The computer system of claim 13, wherein the operations further comprise:
logging information about the batch job each time the batch job runs such that a progress of the data quality metrics over time can be monitored.

15. A non-transitory computer-readable medium comprising software instructions that, when executed by a computer processor, cause the computer processor to perform operations of:
in response to one or more scripts launched as a batch job, querying a hierarchy of exploration data assets according to one or more data quality rules from a set of data quality rules, wherein the one or more scripts describe a plurality of tables that store
(i) metadata that characterize a hierarch of exploration data assets, wherein the hierarchy of exploration data assets comprise databases holding data records obtained from a geophysical exploration when core samples are extracted from a plurality of wells drilled during the geophysical exploration for measurements,
(ii) metadata that characterize a set of data quality rules, wherein the set of data quality rules specify at least one physical relationship between core samples whose measurements, as obtained from the geophysical exploration, are captured in at least two data records of the databases, and
(iii) metadata that characterize defects identifiable as defective data records in the databases of the hierarchy of exploration data assets, wherein defective data records fail to comply with the set of data quality rules;
identifying instances of defective data records that fail to meet the one or more data quality rules;
based on analyzing the instances of defective data records, calculating one or more data quality metrics for the hierarchy of exploration data assets, wherein the one or more data quality metrics comprise an aggregated statistic measure of defective data records in the databases of the hierarch of exploration data assets; and
continuously monitoring the one or more data quality metrics for the hierarchy of exploration data assets; and
in response to the one or more data quality metrics exceeding a threshold, alerting an operator.

16. The non-transitory computer-readable medium of claim 15, wherein querying the hierarchy of exploration data assets comprises:
running one or more structured query language (SQL) statements to enforce the one or more data quality rule based on the metadata of the set of data quality rules and the metadata of the hierarchy of exploration data assets.

17. The non-transitory computer-readable medium of claim 16, wherein the operations further comprise:
storing, according to the metadata that characterizes the defects, information capable of identifying the instances of defective data records that fail to meet the one or more data quality rules;

based on the stored information, calculating one or more data quality metrics for the hierarchy of exploration data assets; and monitoring the hierarchy of exploration data assets based on the calculated one or more data quality metrics.

18. The non-transitory computer-readable medium of claim 16, wherein the one or more scripts include the one or more structured query language (SQL) statements.

19. The non-transitory computer-readable medium of claim 18, wherein the plurality of tables further stores metadata of the batch job that characterizes the batch job.

20. The non-transitory computer-readable medium of claim 19, wherein the operations further comprise:

logging information about the batch job each time the batch job runs such that a progress of the data quality metrics over time can be monitored.

* * * * *